Figure 1:
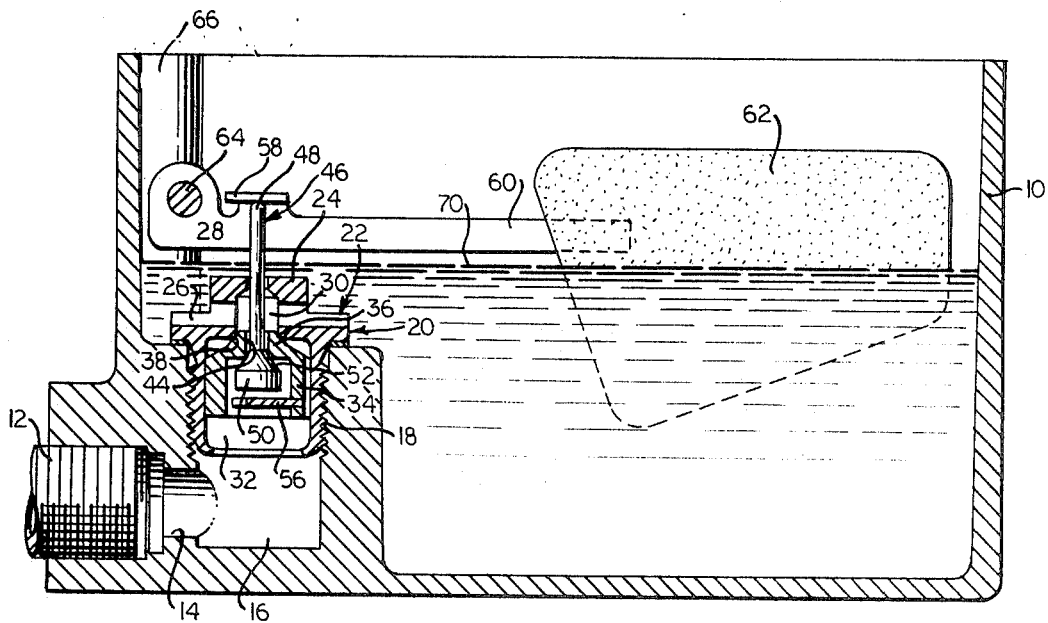

United States Patent

[11] 3,593,740

| [72] | Inventors | Robert S. Harrison<br>Detroit;<br>Joseph F. Lopiccola, Warren, both of, Mich. |
|---|---|---|
| [21] | Appl. No. | 778,436 |
| [22] | Filed | Nov. 25, 1968 |
| [45] | Patented | July 20, 1971 |
| [73] | Assignee | Ford Motor Company<br>Dearborn, Mich. |

[54] CARBURETOR FLOAT BOWL FUEL INLET VALVE
7 Claims, 3 Drawing Figs.

[52] U.S. Cl. .................................................. 137/411,
137/434, 137/438, 137/442, 137/630.14
[51] Int. Cl. ................................................... F16k 31/18
[50] Field of Search .......................................... 137/434,
435, 409, 438, 442, 411, 443, 444, 630.14,
630.15; 261/67, 70; 251/120, 231

[56] References Cited
UNITED STATES PATENTS

| 828,374 | 8/1906 | Blein et al. | 137/630.15 |
|---|---|---|---|
| 993,912 | 5/1911 | Thorsk | 137/630.15 |
| 1,298,849 | 4/1919 | Wolff | 137/630.15 |
| 1,464,286 | 8/1923 | Lundblad | 137/630.15 |
| 2,138,792 | 11/1938 | Kronmiller | 137/630.14 |
| 1,173,871 | 2/1916 | Royer | 137/436 |
| 1,176,754 | 3/1916 | Hedges | 137/630.14 X |
| 1,817,379 | 8/1931 | Kallmeyer | 137/411 |
| 2,781,772 | 2/1957 | Russell | 137/630.15 X |
| 2,790,456 | 4/1957 | Shaw et al. | 137/434 X |
| 2,801,645 | 8/1957 | White | 137/411 |
| 3,011,515 | 12/1961 | Kravagna | 137/411 |
| 3,454,036 | 7/1969 | Thompson | 137/444 X |

FOREIGN PATENTS

| 128,618 | 7/1919 | Great Britain | 137/630.15 |

*Primary Examiner*—M. Cary Nelson
*Assistant Examiner*—David R. Matthews
*Attorneys*—John R. Faulkner and Robert E. McCollum

ABSTRACT: A carburetor float bowl has a two-stage fuel inlet valve consisting of a small valve providing finite control for low rate of flow into the float bowl, and a larger valve actuated by the smaller valve to provide a relatively unrestricted opening between the fuel inlet and float bowl interior to permit operation of the fuel pump essentially at its full capacity if desired.

PATENTED JUL 20 1971

3,593,740

INVENTORS
ROBERT S. HARRISON &
BY JOSEPH F. LOPICCOLA

John R. Faulkner
Robert E. McCollum
ATTORNEY

CARBURETOR FLOAT BOWL FUEL INLET VALVE

This invention relates, in general, to the fuel system for a motor vehicle engine. More particularly, it relates to a fuel inlet valve for the float bowl of the carburetor.

It is a primary object of the invention to provide a carburetor float bowl with a two-stage fuel inlet valve having a restricted opening providing a fine control of the supply of fuel to the carburetor, and as essentially unrestricted opening providing a high rate of flow permitting the fuel pump to operate at full capacity, if desired.

The invention accomplishes the above objective by providing a fuel inlet valve assembly consisting of a small poppetlike valve in the fuel inlet that restricts fuel flow to a fine degree and, a larger valve surrounding the smaller valve and movable to withdraw the restriction to flow imposed by the first valve, thereby providing an essentially unrestricted discharge opening permitting operation of the pump at its full capacity, if desired.

Figure 2:
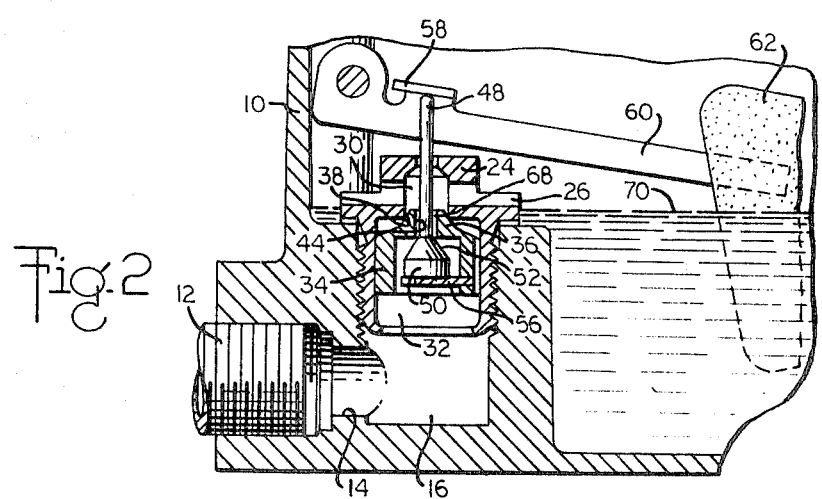
Figure 3:
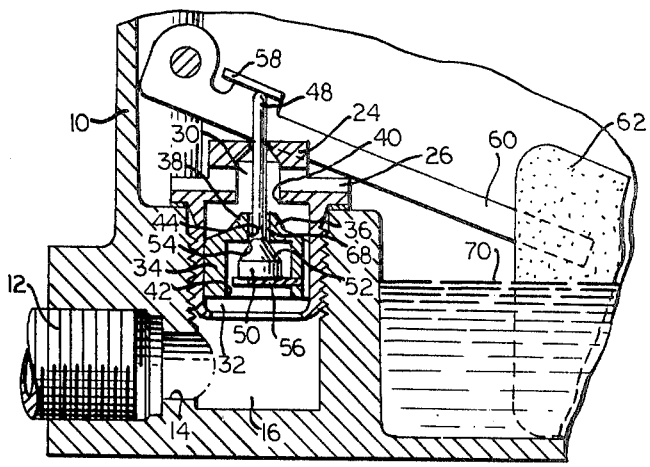

Other objects features and advantages of the invention will become more apparent upon reference to the succeeding detailed description thereof; wherein, FIG. 1 is a cross-sectional view of a carburetor float bowl embodying the invention; and, FIGS. 2 and 3 are cross-sectional views corresponding to FIG. 1 and illustrating the invention in different operative positions.

FIG. 1 shows a hollow cup-shaped float bowl 10 normally associated with a conventional -type carburetor, not shown, While the bowl, in this instance, is cast, it will be clear that it could be formed from a stamping without departing from the scope of the invention. The bowl has a boss 11 at one end provided with a fluid inlet port or opening 12 connected by a bore 14 to an intersecting bore or well 16 extending at right angles thereto. Bore 16 opens upwardly as shown into a median portion of the float bowl. It is threaded internally at 18 for removably receiving therein the outer stationary housing 20 of a fuel inlet valve assembly 22

The upper portion 24 of housing 20 is essentially hat-shaped in cross section and freely communicates well 16 with the float bowl interior by means of a pair of intersecting bores 26 and 28 connected to a central chamber 30. The lower portion of housing 20 is hollow providing a valve-containing chamber 32. The latter slidably received therein a sleevelike valve member 34.

Valve member 34 is formed at its closed end 36 with an essentially conically tapered face 38. The face is adapted at times to cooperate with a knife edge seat 40 of housing 20 to seal against leakage of fluid between chambers 32 and 30 around valve 34. The hollow recess of valve 34 is connected to chamber 30 by a bore 44.

A second valve member 46 has a stem 48 loosely slidable through bore 44 and connected to a poppetlike valve portion 50. The latter has a conical like outer face 52 adapted to cooperate in a sealing manner with a knife edge seat 54 defined by the bore 44. Valve member 34 further includes a stop 56 that projects into the path of movement in one direction of valve member 46 to be engaged thereby so that the two valves will subsequently move as a unit in the one direction, in a manner to be described more clearly later.

The upper end of valve stem 48 normally contacts the underside of an essentially flat platelike arm 58 that projects at right angles from a float bowl lever 60. The latter is secured at one end to a suitable float 62 and at the other end is pivotally mounted at 64 on a cast portion 66 of float bowl 10.

Further details of construction and operation of the float bowl mechanism and the details of the carburetor normally associated therewith are not given since they are known and believed to be unnecessary for an understanding of the invention. Suffice it to say that float bowl 10 would have a fuel outlet controlled by a valve, the latter being operatively connected to the float 62 in a known manner so as to open in response to down ward pivotal movement of float 62 to permit a discharge of fuel into the carburetor and closing upon a refill of the float bowl and a vertical upward movement of float 62.

FIG. 1 shows the float and fuel inlet valve parts in the positions attained when the float bowl is filled to the highest level desired. The two stage fuel inlet valve is closed so at to prevent entry of fuel from inlet 12 into the bowl interior. The level 70 of the fuel is such as to maintain float 62 in the horizontal position shown. In this case, both valve members 3 and 50 are seated to block flow from well 16 to the interior of the float bowl. The pressure of the fluid in this case acting against the valves plus the buoyancy force acting against float 62 is sufficient to maintain the valves closed.

FIG. 2 illustrating the positions of the parts when the fuel level 70 has dropped. In this case, the weight of float 62 causes a pivotal movement of lever 60 against the force of the fluid pressure in bore 16 acting on the valves. This moves valve stem 48 and valve 50 downwardly and cracks open communication between the float bowl and bore 16 through the aperture 44 and interior 42 of valve 34. There then will be a controlled communication of fuel from bore 16 to the float bowl interior by means of the restricted annular space 68 between stem 48 and aperture 44. When the drop in level 70 of the fuel is slow, such as during idle speed, normal cruising, or low load conditions of engine operation, the fuel discharge from the float bowl will be relatively small, thereby requiring the fine control provided by the restriction 68 and valve 50.

FIG. 3 shown the operation of the invention when a large supply of fuel is required to compensate for a rapidly depleting float bowl. In this case, the rapid discharge of fuel from the float bowl has caused float 62 to drop by its weight to the position shown fully depressing valve 46 to a point where it has engaged stop 56 and moved valve member 34 off its seat. This opens wide the communication between the bore 16 and the float bowl interior so that an essentially unrestricted discharge opening is provided, thereby permitting the operation of the fuel pump, not shown, at its full capacity, if desired.

It will be seen, therefore, that the invention provides a two-stage fuel inlet valve assembly in which a first small valve provides a finite control of the fuel supply into the float bowl, and is operatively connected to a second large flow valve that upon actuation by said first valve permits an essentially unrestricted flow of fuel from a fuel reservoir or float bowl interior. It will further be seen that the two stage inlet valve of the invention operates in a manner that is generally opposite to the conventional carburetor float bowl valve in that the fuel inlet closes when pressure on the valve exceeds the buoyant force of the float and opens when the pressure is lower than the buoyant force.

While the invention has been shown and described in its preferred embodiment, it will be clear to those skilled in the arts to which it pertains that many changes and modifications may be made thereto without departing from the scope of the invention.

We claim:

1. A fuel inlet control valve assembly for use in a motor vehicle carburetor having a fuel bowl having a float, a lever fixed thereto, means mounting said lever on said bowl for an arcuate pivotal movement of said float in an essentially vertical plane as a function of the changes in level of fuel in said bowl, and a fuel inlet to said bowl below the normal level of fuel therein, comprising, a first valve means in said inlet movable by the pressure of the fluid in said inlet thereagainst in a direction to close said inlet, said lever being engageable with said valve for moving said valve in the opposite direction upon lowering of the fuel level is said bowl from a predetermined level, and second valve means in said inlet movable by fuel under pressure acting thereagainst to a position restricting flow through said inlet, and engageable by said first valve means at times upon movement of said first valve means in the opposite direction to move said second valve means to a position permitting unrestricted flow through said inlet.

2. A valve assembly as in claim 1, said first and second valve means being concentrically mounted one within the other.

3. A valve assembly as in claim 1, said first valve means comprising a poppet-type valve having a stem engaged by said stem projecting through a fuel passage in said second valve means with a flow clearance therebetween, said first valve means being seatable in said passage by fuel pressure thereagainst to block fuel flow therethrough, said second valve being seatable against said inlet to block said inlet when said first valve is seated in said passage.

4. A valve assembly as in claim 2, said second valve having means projecting into the path of inlet opening movement of said first valve to be engaged thereby and moved.

5. A two-stage fuel inlet control valve assembly to control the flow of fuel into the fuel bowl of a motor vehicle carburetor having a float, a lever fixed to said float and pivotally mounted at one end on said bowl for an arcuate movement of of said float as a function of the changes in level of fuel in said bowl, and a fuel inlet to said bowl below the normal level of fuel therein, comprising, a hollow cylindricallike valve body in said inlet having one end open to the fuel in said inlet and the opposite end opening into said fuel bowl, said valve body slidably receiving therein a first valve body slidably receiving therein a first valve member movable in one direction by the fluid in said inlet to cooperate with the said valve body opposite end to block the same, said first valve member having an essentially cup shape with an axial aperture in the closed end portion thereof, a second valve member slidably mounted within said first valve member and having means projecting through said aperture and valve body opposite end opening into an adjacency relationship with a portion of said float lever to be contacted at times thereby, said second valve member being movable in one direction by the fluid in said inlet into cooperating with said first valve member aperture to block the same and movable in the opposite direction by said float lever to unblock said aperture, and means secured to said first valve member in the path of movement of said second valve member in the opposite direction engageable by said second valve member for moving said first valve member to a position unblocking said valve body opposite end.

6. An assembly as in claim 5, said second valve member having a tapered portion cooperating with a matingly formed seat portion of said first valve member defining said aperture.

7. An assembly as in claim 5, said second valve member means projecting through said aperture comprising a stem of an area providing a restricted flow area between said stem and the portion of first valve member defining said aperture.